(12) United States Patent
Sakai et al.

(10) Patent No.: US 11,465,541 B2
(45) Date of Patent: Oct. 11, 2022

(54) AIR PUMP DEVICE AND SEAT DEVICE

(71) Applicants: AISIN CORPORATION, Aichi (JP); TOYOTA JIDOSHA KABUSHIKI KAISHA, Toyota (JP)

(72) Inventors: Makoto Sakai, Anjo (JP); Ryosuke Mizuno, Toyota (JP); Tomokazu Seki, Kariya (JP); Katsuya Nozue, Toyohashi (JP); Yasuo Kidena, Kariya (JP); Shunsuke Tanaka, Nisshin (JP); Kenji Hashimoto, Nisshin (JP)

(73) Assignees: AISIN CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 920 days.

(21) Appl. No.: 16/323,362

(22) PCT Filed: Aug. 1, 2017

(86) PCT No.: PCT/JP2017/027870
§ 371 (c)(1),
(2) Date: Feb. 5, 2019

(87) PCT Pub. No.: WO2018/030214
PCT Pub. Date: Feb. 15, 2018

(65) Prior Publication Data
US 2021/0276469 A1    Sep. 9, 2021

(30) Foreign Application Priority Data

Aug. 9, 2016    (JP) .............................. JP2016-156521

(51) Int. Cl.
*B60N 2/90* (2018.01)
*F04B 35/04* (2006.01)
(Continued)

(52) U.S. Cl.
CPC .............. *B60N 2/976* (2018.02); *B60N 2/914* (2018.02); *F04B 35/04* (2013.01); *F04B 39/00* (2013.01); *F04B 39/12* (2013.01)

(58) Field of Classification Search
CPC ......... B60N 2/976; B60N 2/914; F04B 35/04; F04B 39/00; F04B 39/12; F04B 35/00; F04B 35/045
(Continued)

(56) References Cited

U.S. PATENT DOCUMENTS 5,407,330 A     4/1995  Rimington et al.
10,293,718 B1 * 5/2019  Ilievski ................. B60N 2/501
(Continued)

FOREIGN PATENT DOCUMENTS

CN    101375206 A    2/2009
CN    101646880 A    2/2010
(Continued)

OTHER PUBLICATIONS

Combined Chinese Office Action and Search Report dated Jul. 29, 2019, in Patent Application No. 201780047102.0, 16 pages (with English translation).
(Continued)

*Primary Examiner* — Mark R Wendell
(74) *Attorney, Agent, or Firm* — Oblon, McClelland, Maier & Neustadt, L.L.P.

(57) ABSTRACT

This air pump device is provided with: an electric pump unit including a pump mechanism and a motor; a case; and a vibration-proof member. The pump mechanism and the motor are arranged side by side in the axial direction of the motor. The pump mechanism has an inlet and an outlet at an end in the axial direction on the opposite side of the motor. The case has a first wall and a second wall which are located on opposite sides in the axial direction of the motor and
(Continued)

which face the electric pump unit. The vibration-proof member is provided with: a first axial vibration-proof unit interposed between the electric pump unit and the first wall; and a second axial vibration-proof unit interposed between the electric pump unit and the second wall. The first axial vibration-proof unit covers the inlet.

7 Claims, 6 Drawing Sheets

(51) Int. Cl.
  *F04B 39/00* (2006.01)
  *F04B 39/12* (2006.01)
(58) Field of Classification Search
  USPC .................................................... 297/284.3
  See application file for complete search history.

(56) References Cited

U.S. PATENT DOCUMENTS

| | | |
|---|---|---|
| 2001/0049036 A1 | 12/2001 | Raiser |
| 2007/0012298 A1 | 1/2007 | Nakamura et al. |
| 2013/0075572 A1 | 3/2013 | Matsumoto et al. |
| 2021/0276469 A1* | 9/2021 | Sakai ................. F04B 35/04 |

FOREIGN PATENT DOCUMENTS

| | | |
|---|---|---|
| CN | 203763554 U | 8/2014 |
| CN | 204476875 U | 7/2015 |
| DE | 693 07 265 T2 | 7/1997 |
| DE | 100 27 350 B4 | 5/2010 |
| DE | 10 2012 224 449 A1 | 7/2014 |
| JP | 32-91 68 Y1 | 8/1957 |
| JP | 48-28703 U | 4/1973 |
| JP | 60-34260 U | 3/1985 |
| JP | 3121232 U | 4/2006 |
| JP | 2006-198071 A | 8/2006 |
| JP | 2010-235021 A | 10/2010 |
| JP | 2012-25204 A | 2/2012 |
| WO | WO 2011/158538 A1 | 12/2011 |

OTHER PUBLICATIONS

International Search Report dated Oct. 24, 2017 in PCT/JP2017/027870 filed on Aug. 1, 2017.
German Office Action dated Jan. 20, 2021 in German Patent Application No. 11 2017 003 995.9 (with English translation), 6 pages.

* cited by examiner

AIR PUMP DEVICE AND SEAT DEVICE

TECHNICAL FIELD

The present invention relates to an air pump device and a seat device.

BACKGROUND ART

Patent document 1 describes an example of a vehicle seat device that inflates and deflates air packs (bladders) arranged inside a seat so that the form of a support of the seat can be changed. Patent document 2 describes a further example of a seat device including air packs that are inflated and deflated to press against the seat upholstery from the inner side. This has a massaging effect on the vehicle occupant seated on the seat.

Typically, such a seat device uses an air pump device, of which the drive source is a motor, to send pressurized air to the air packs, inflating the air packs. Patent document 2 discloses an air pump device arranged inside the trunk at the rear of the vehicle to reduce the effect of vibration and noise that is produced when the air pump device is operated.

PRIOR ART LITERATURE

Patent Literature

Patent Document 1: Japanese Laid-Open Patent Publication No. 2010-235021
Patent Document 2: Japanese Laid-Open Patent Publication No. 2006-198071

SUMMARY OF THE INVENTION

Problem to be Solved by the Invention

With the above structure, there is a need to obtain sufficient space in the trunk to allow for stable operation of the air pump device. In addition, the above structure lengthens the air passage connecting the air pump device and the air packs. This makes it difficult to lay out the tubes of the air passage. Further, the tubes need to be protected. Thus, there is a need for an air pump device having superior quietness and being small enough to be arranged inside the seat with the air packs.

One object of the present invention is to provide an air pump device and a seat device having superior quietness and superior vehicle seat mountability. MEANS FOR SOLVING THE PROBLEM An air pump device that achieves the above objective includes an electric pump unit including a pump mechanism and a motor that drives the pump mechanism. The pump mechanism and the motor are integrated with each other. The air pump device further includes a case, which accommodates the electric pump unit, and an anti-vibration member, which is arranged between the electric pump unit and the case. The pump mechanism and the motor are aligned in an axial direction of the motor. The pump mechanism includes an inlet and an outlet in an axial end at a side opposite to the motor in the axial direction of the motor. The case includes a first wall and a second wall that are located at opposite sides in the axial direction of the motor and oppose the electric pump unit. The anti-vibration member includes a first axial anti-vibration portion, which is arranged between the electric pump unit and the first wall in the axial direction of the motor, and a second axial anti-vibration portion, which is arranged between the electric pump unit and the second wall in the axial direction of the motor. The first axial anti-vibration portion covers the inlet to function as an air filter of the pump mechanism.

A seat device that achieves the above object includes the air pump device, a seat, and an air pack arranged inside the seat. The air pump device is configured to send pressurized air to the air pack.

EMBODIMENTS OF THE INVENTION

One embodiment of a seat device, which has a pneumatic seat support function and a massaging function, and an air pump device, which is incorporated in the seat device, will now be described with reference to the drawings.

Figure 1:
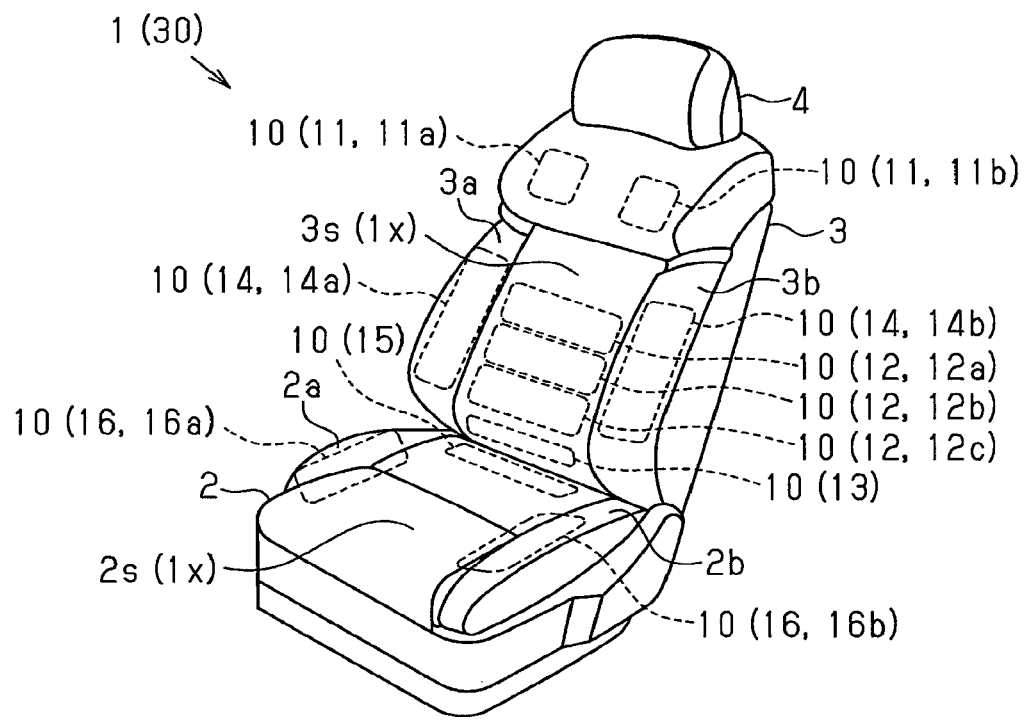
FIG. 1 is a perspective view of a vehicle seat showing seat support air packs arranged inside the seat.
Figure 2:
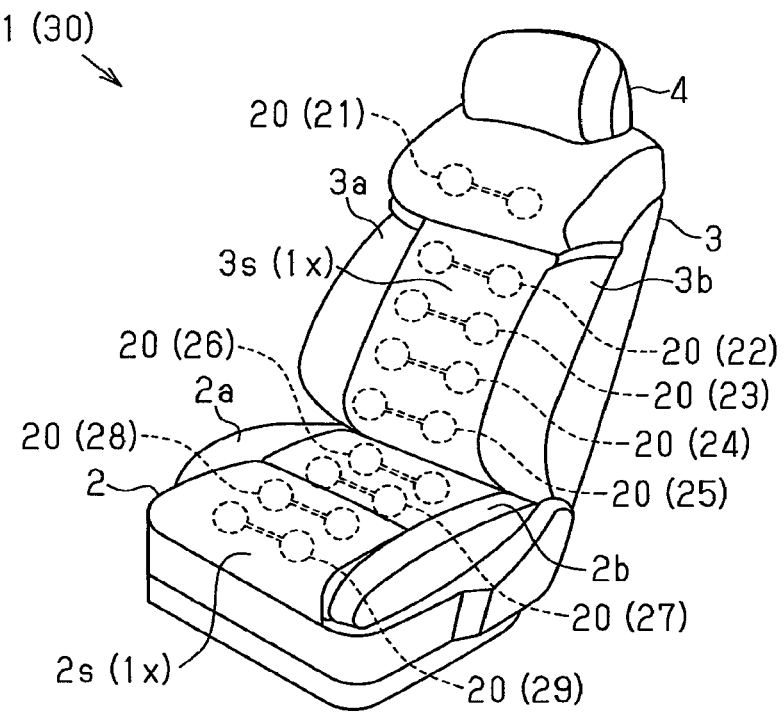
FIG. 2 is a perspective view of the vehicle seat illustrated in FIG. 1 showing massaging air packs arranged inside the seat.

As shown in FIGS. 1 and 2, a vehicle seat 1 includes a seat cushion 2 and a seat back 3 arranged at a rear end of the seat cushion 2. Further, the seat back 3 includes an upper end where a head rest 4 is arranged.

The seat back 3 further includes side portions 3a and 3b that are bulged forward. The seat cushion 2 includes side portions 2a and 2b that are bulged upward. This allows the seat 1 to be set in a desirable seating position for a vehicle occupant and maintain the seating position.

The seat 1 includes a plurality of air packs 10 (11 to 16) inside the seat cushion 2 and the seat back 3. The air packs 10 (11 to 16) are inflated and deflated to change the surface form of the seat 1. Further, the seat 1 includes a plurality of air packs 20 (21 to 29) inside the seat cushion 2 and the seat back 3. The air packs 20 (21 to 29) are inflated and deflated to press a seat surface 1x from an inner side. This allows a seat device 30 to change the form of a support of the seat 1 and provide a massaging effect or a refreshing effect to the vehicle occupant sitting on the seat 1.

Specifically, as shown in FIG. 1, the seat back 3 includes a backrest surface 3s and independent seat-support air packs 11, 12, and 13. The air packs 11 (11a and 11b) are arranged inside the seat back 3 at locations corresponding to a shoulder portion of the backrest surface 3s, the air packs 12 (12a to 12c) are arranged inside the seat back 3 at locations corresponding to a waist portion of the backrest surface 3s, and the air pack 13 is arranged inside the seat back 3 at a location corresponding to a lower end portion of the backrest surface 3s. Further, the seat back 3 includes independent seat support air packs 14. The air packs 14 (14a and 14b) are arranged at locations corresponding to the side portions 3a and 3b, respectively. Also, the seat cushion 2 includes a seating surface 2s and independent seat-support air packs 15 and 16. The air pack 15 is arranged at an inner side of a rear end portion (cushion pelvis) of the seating surface 2s, and the air packs 16 (16a and 16b) are respectively arranged at an inner side of the side portions 2a and 2b of the seating surface 2s.

Further, as shown in FIG. 2, the seat back 3 includes independent massaging (refreshing) air packs 21 to 25 lined in a vertical direction below the backrest surface 3s from the shoulder portion to the waist portion and the lower end portion. The massaging air packs 20 are arranged in pairs. The air packs 20 in each pair are spaced apart in a widthwise direction of the seat and connected to each other so as to be integrally inflated and deflated. Also, the seat cushion 2 includes independent massaging air packs 27 to 29 that are arranged in a front-rear direction below the seating surface 2s.

Figure 3:
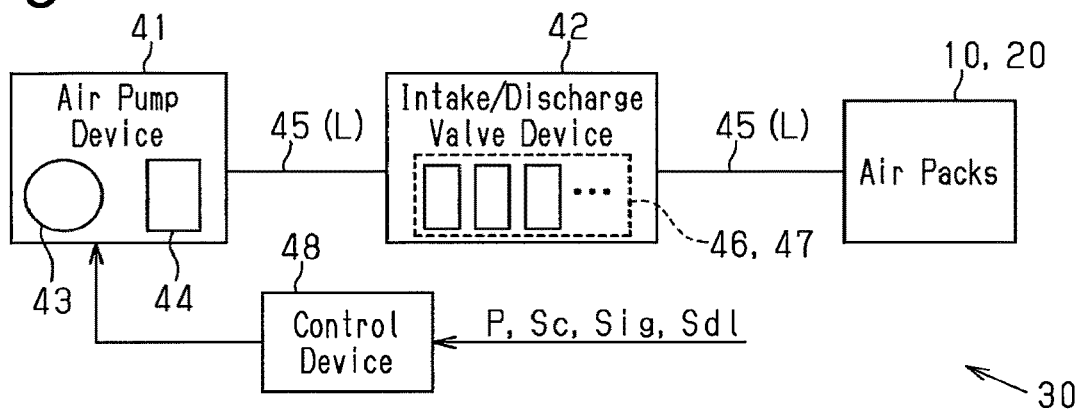
FIG. 3 is a schematic diagram of a seat device.

As shown in FIG. 3, the seat device 30 includes an air pump device 41 and an intake/discharge valve device 42. The air pump device 41 sends pressurized air to the air packs 10 and 20. The intake/discharge valve device 42 is arranged between the air packs 10 and 20 and the air pump device 41. The air pump device 41 includes an electric pump of which the drive source is a motor 43 to drive a pump mechanism 44. Further, the intake/discharge valve device 42 is connected to the air packs 10 and 20 and the air pump device 41 by flexible resin tubes 45. The tubes 45 and an inner passage of the intake/discharge valve device 42 form an air passage L that is in communication with the air packs 10 and 20 and the air pump device 41. The intake/discharge valve device 42 includes an intake valve 46 and a discharge valve 47. The intake valve 46 and the discharge valve 47 are located in the passage L.

A control device 48 controls the operations of the intake valve 46, the discharge valve 47, and the air pump device 41. Specifically, the control device 48 receives signals including a signal indicating an inner pressure P of each of the air packs 10 and 20, an operation input signal Sc generated to correspond with operation on an operation switch (not shown), an ignition signal Sig, and a door lock signal Sd1. Based on the input signals, the control device 48 controls the operations of the intake valve 46, the discharge valve 47, and the air pump device 41 to inflate and deflate the air packs 10 and 20.

Air Pump Device

The air pump device arranged in the seat device of the present embodiment will now be described.

As shown in FIGS. 4 to 7, the air pump device 41 includes the motor 43, the pump mechanism 44, and a case 50 that accommodates the motor 43 and the pump mechanism 44. The case 50 is a substantially rectangular cuboid. Further, the case 50 is formed by coupling a first case portion 51 and a second case portion 52 that are substantially box-shaped. The air pump device 41 is located inside the seat 1 in the vicinity of a side frame 3f that constructs the frame of the seat back 3.

Figure 7:
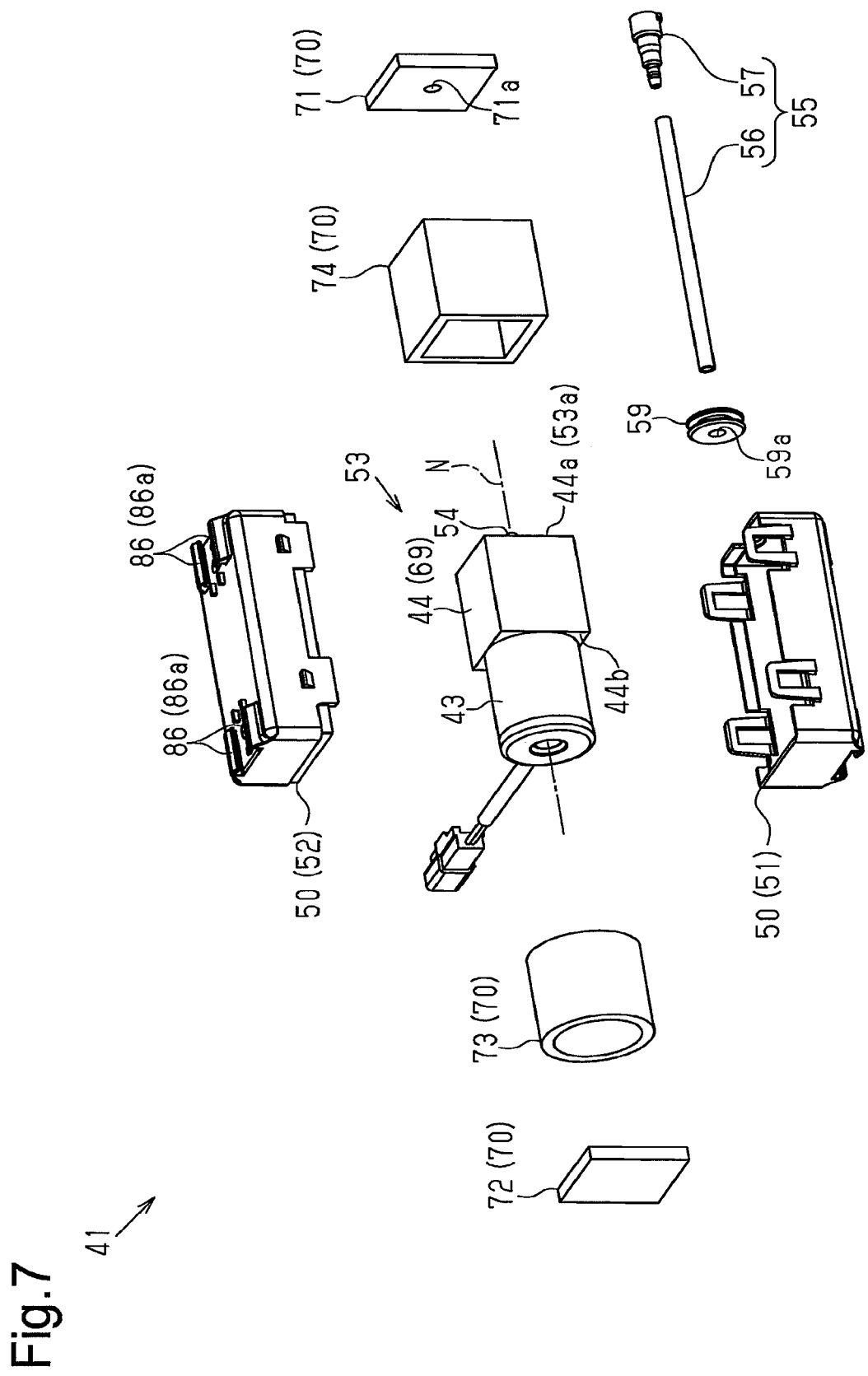
FIG. 7 is an exploded perspective view of the air pump device illustrated in FIG. 5.
Figure 8:
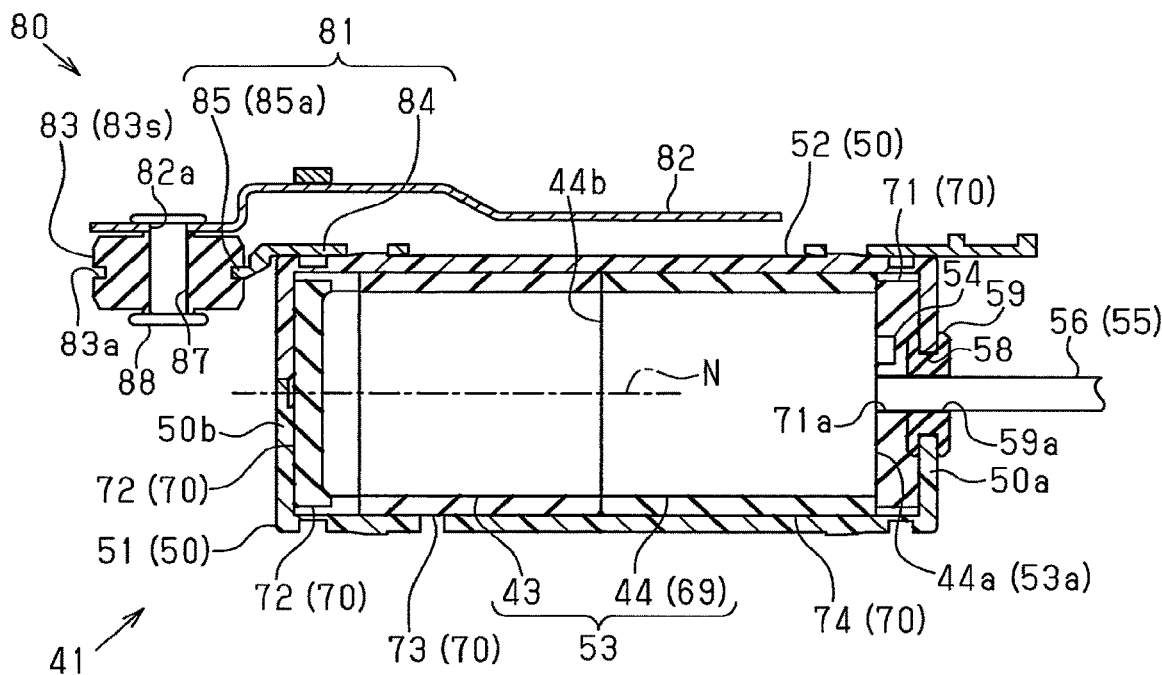
FIG. 8 is a cross-sectional view of the air pump device and the anti-vibration device taken along line VIII-VIII in FIG. 5.

As shown in FIGS. 7 and 8, the motor 43 and the pump mechanism 44 are integrated with each other and form an electric pump unit 53. The pump mechanism 44 and the motor 43 are arranged next to each other in an axial direction of the motor 43 (direction along axis N in FIGS. 7 and 8). The motor 43 is a substantially circular column and extends in the axial direction, and the pump mechanism 44 is a substantially square column. The electric pump unit 53 is accommodated inside the case 50, and the axis N of the motor 43 corresponds to a longitudinal direction of the case 50.

More specifically, in the axial direction of the motor 43, the pump mechanism 44 has an axial end 44a at a side opposite to the motor 43, and the axial end 44a includes an air inlet 54. The inlet 54 is substantially cylindrical. The inlet 54 is formed inside the case 50.

Further, the pump mechanism 44 includes an air outlet 55 at the axial end 44a including the inlet 54. The outlet 55 includes a tube 56, which extends from the axial end 44a, and a joint 57, which is connected to a distal end of the tube 56. The case 50 includes a first wall 50a opposing the axial end 44a of the pump mechanism 44 where the outlet 55 is formed, and the first wall 50a includes a through hole 58. A rubber bushing 59 is fitted to the through hole 58. The tube 56 is inserted through an insertion hole 59a of the rubber bushing 59 so that the distal side of the tube 56 is drawn out of the case 50.

Figure 4:
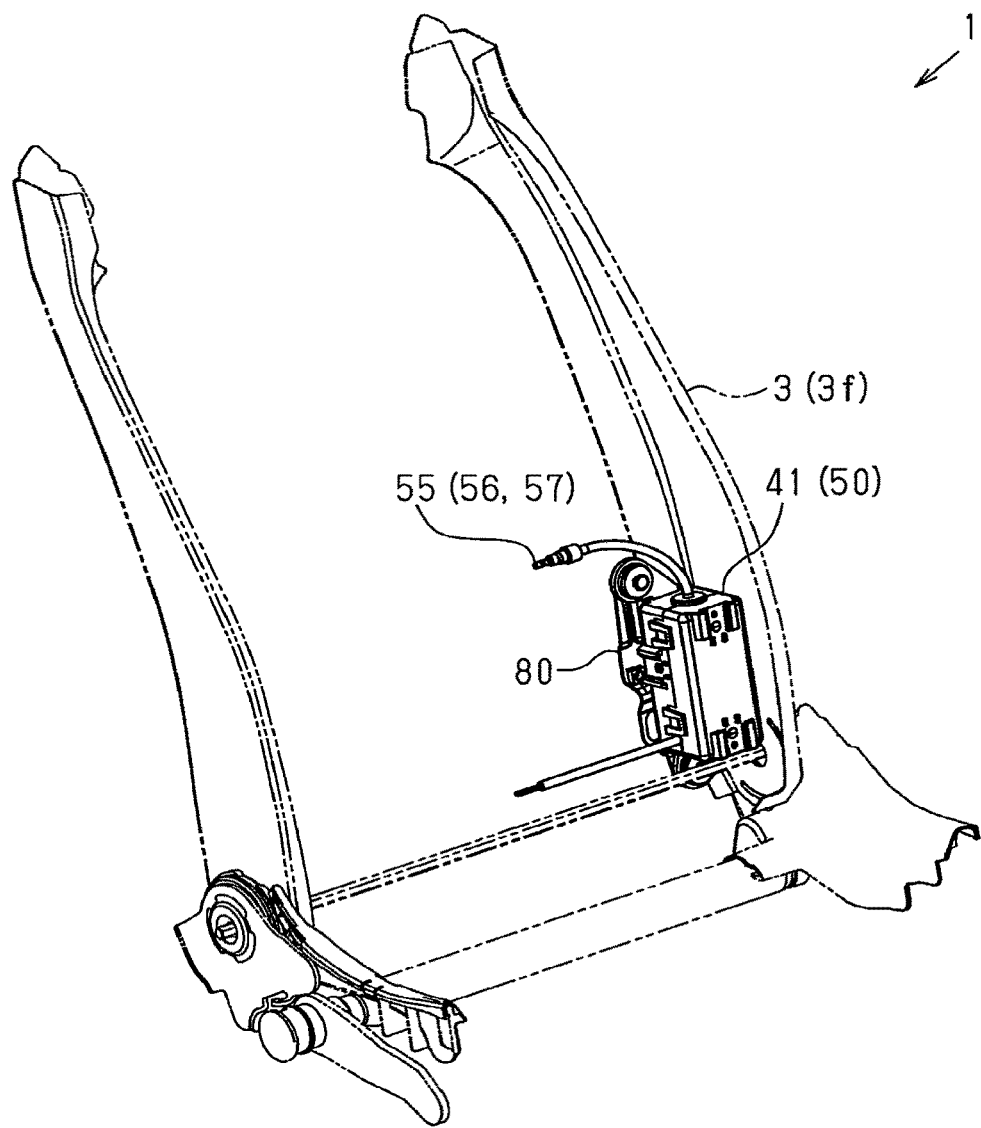
FIG. 4 is a perspective view of an air pump device arranged in the vicinity of a side frame of a seat back.
Figure 5:
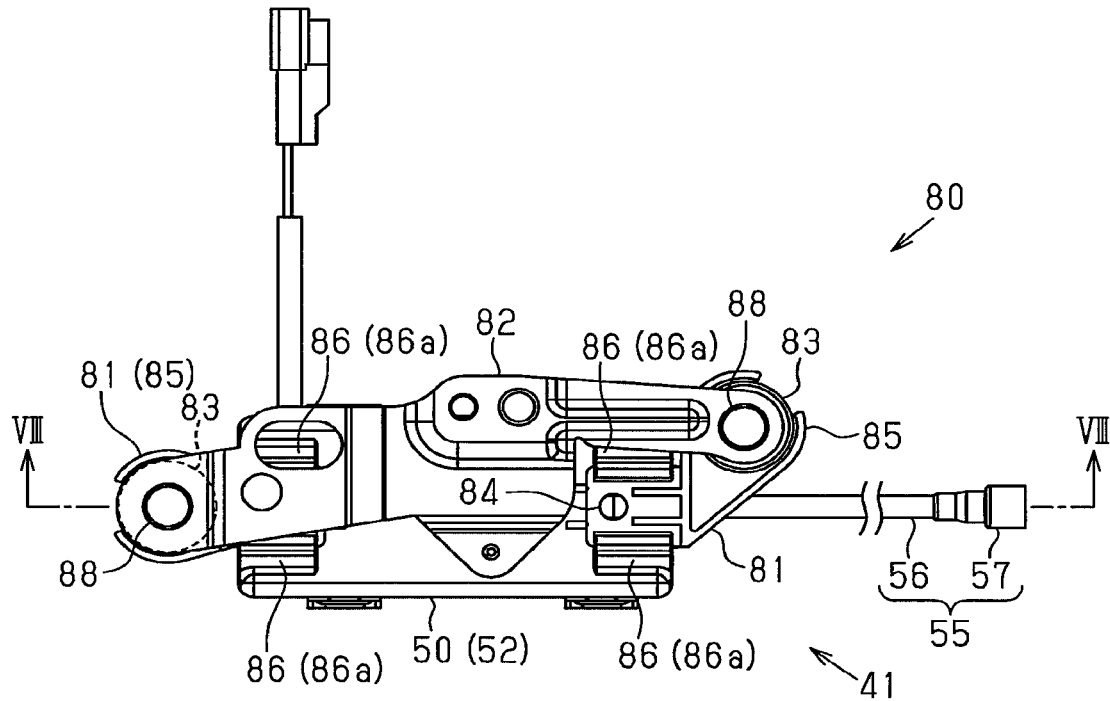
FIG. 5 is a plan view of the air pump device and an anti-vibration device.

As shown in FIG. 4, the air pump device 41 is arranged on the side frame 3f so that the longitudinal direction of the electric pump unit 53, which corresponds to the axial direction of the motor 43, corresponds to a direction in which the side frame 3f of the seat back 3 extends. Accordingly, the tube 56 is drawn out of an upper side of the case 50.

Figure 9:
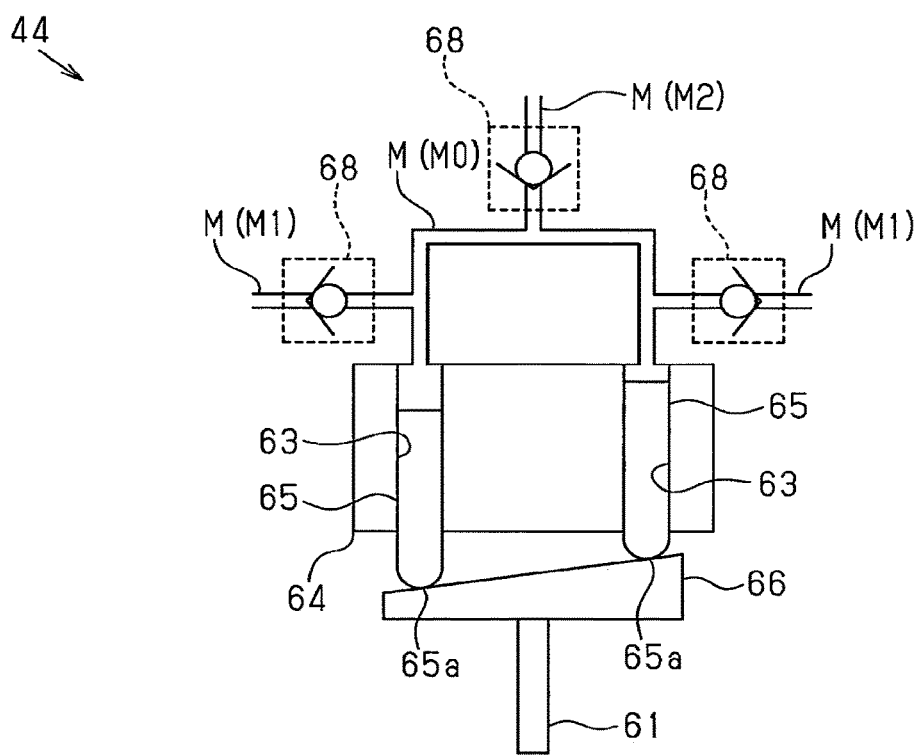
FIG. 9 is a schematic diagram of a piston pump used in the air pump device illustrated in FIG. 5.

As shown in FIG. 9, the pump mechanism 44 functions as an axial piston pump. Specifically, the pump mechanism 44 includes a drive shaft 61 and a cylinder block 64. The drive shaft 61 is rotated by the drive force of the motor 43. The cylinder block 64 includes a plurality of cylinders 63 arranged at eccentric positions relative to the drive shaft 61. Further, the pump mechanism 44 includes a plurality of pistons (plungers) each arranged inside a corresponding one of the cylinders 63. Each piston 65 includes a basal end 65a projecting out of the cylinder block 64. The pump mechanism 44 includes a swash plate 66 that contacts the basal ends 65a of the pistons 65 and rotates integrally with the drive shaft 61.

Rotation of the swash plate 66 changes the positions where the pistons 65 contact the swash plate 66 in an axial direction of the drive shaft 61. This reciprocates the pistons 65 in the cylinders 63.

Further, an end of the cylinder block 64 at opposite to the swash plate 66 (upper end in FIG. 9) includes passages M connecting the cylinders 63 to the inlet 54 and the outlet 55. The passages M include a main line M0, branch lines M1, and a branch line M2. The main line M0 is connected to the cylinders 63. The branch lines M1 branch off from the main line M0 and extend toward the inlet 54. The branch line M2 branches off from the main line M0 and extends toward the outlet 55. A check valve 68 is arranged in each of the branch lines M1 and the branch line M2 to prevent a reversed flow of air. The pump mechanism 44 draws in air from the inlet 54 when the pistons 65 reciprocate and vary the displacement of the cylinders 63 and sends the pressurized air to the outlet 55.

As shown in FIG. 7, the elements 61 to 68 forming the pump mechanism 44 are accommodated in a housing 69 that is a substantially square column. The cylinder block 64 is arranged inside the housing 69 so that the cylinders 63 extend in the axial direction of the motor 43 (vertical direction in FIG. 9). This allows the dimensions of the pump mechanism 44 to be reduced in the radial direction of the pump mechanism 44.

Although not shown in the drawings, the branch lines M1 of the passages M, which are connected to the inlet 54, extend from the axial end 44a of the pump mechanism 44 where the inlet 54 is formed to an axial end 44b of the pump mechanism 44 that opposes the motor 43 (from right side to left side in FIG. 8). The branch lines M1 each includes a silencer structure that takes advantage of the long length of the intake air passage (now shown). The silencer structure may be a structure having an inner diameter that is increased and decreased in a lengthwise direction or a labyrinthine structure.

Further, as shown in FIGS. 7 and 8, the air pump device 41 includes anti-vibration members 70 arranged between the case 50 and the electric pump unit 53. That is, the anti-vibration members 70 are arranged inside the case 50.

The case 50 includes the first wall 50a and a second wall 50b that oppose the electric pump unit 53 at opposite sides in the axial direction of the motor 43. The anti-vibration members 70 include a first axial anti-vibration portion 71 and a second axial anti-vibration portion 72. The first axial anti-vibration portion 71 is arranged between the electric pump unit 53 and the first wall 50a in the axial direction of the motor 43. The second axial anti-vibration portion 72 is arranged between the electric pump unit 53 and the second wall 50b in the axial direction of the motor 43. Further, the anti-vibration members 70 include a first radial anti-vibration portion 73 and a second radial anti-vibration portion 74. The first radial anti-vibration portion 73 is attached to the motor 43 to cover the motor 43 from the radially outer side. The second radial anti-vibration portion 74 is attached to the pump mechanism 44 to cover the pump mechanism 44 from the radially outer side, that is, so as to cover four side surfaces of the pump mechanism 44 extending in the axial direction of the motor 43.

The first and second axial anti-vibration portions 71 and 72 are substantially square flat plates. Further, the first radial anti-vibration portion 73 is substantially cylindrical to conform to the substantially circular column shape of the motor 43. The second radial anti-vibration portion 74 is substantially square tubular to conform to the substantially square column shape of the pump mechanism 44 (specifically, housing 69 of pump mechanism 44).

The anti-vibration members 70 (71 to 74) are formed of a sponge-like elastic material. Further, the first axial anti-vibration portion 71 is arranged between the first wall 50a of the case 50 and an axial end 53a of the electric pump unit 53 opposing the first wall 50a, that is, the axial end 44a of the pump mechanism 44. A central portion of the first axial anti-vibration portion 71 includes an insertion hole 71a, and the tube 56 extends through the insertion hole 71a. In addition, the first axial anti-vibration portion 71 is arranged inside the case 50 in a state covering the substantially cylindrical inlet 54 of the pump mechanism 44. The sponge-like first axial anti-vibration portion 71 functions as an air filter of the pump mechanism 44.

The fastening structure of the air pump device 41 of the seat device 30 will now be described.

As shown in FIGS. 5, 6, 8, and 10, the seat device 30 includes an anti-vibration device 80 arranged between the air pump device 41 and the seat 1 (specifically, frame of the seat back 3).

Figure 6:
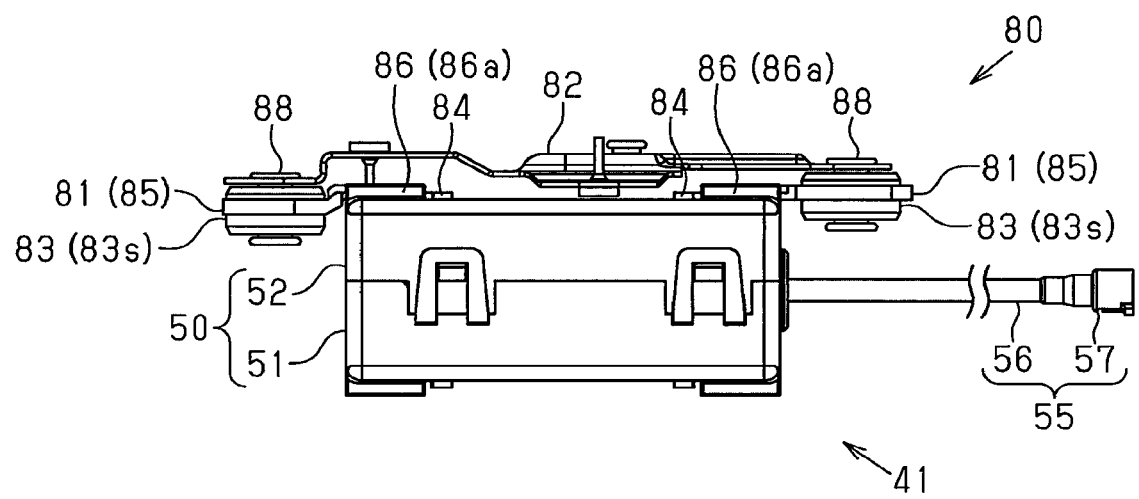
FIG. 6 is a side view of the air pump device and the anti-vibration device illustrated in FIG. 5.

More specifically, as shown in FIG. 6, the anti-vibration device 80 includes two mounting brackets 81, a middle bracket 82, and two rubber bushings 83. The mounting brackets 81 are coupled to the case 50 of the air pump device 41. The middle bracket 82 is coupled to a fixing bracket (not shown) arranged on the frame of the seat back 3. The rubber bushings 83 are each arranged between the corresponding one of the mounting brackets 81 and the middle bracket 82.

Figure 10:
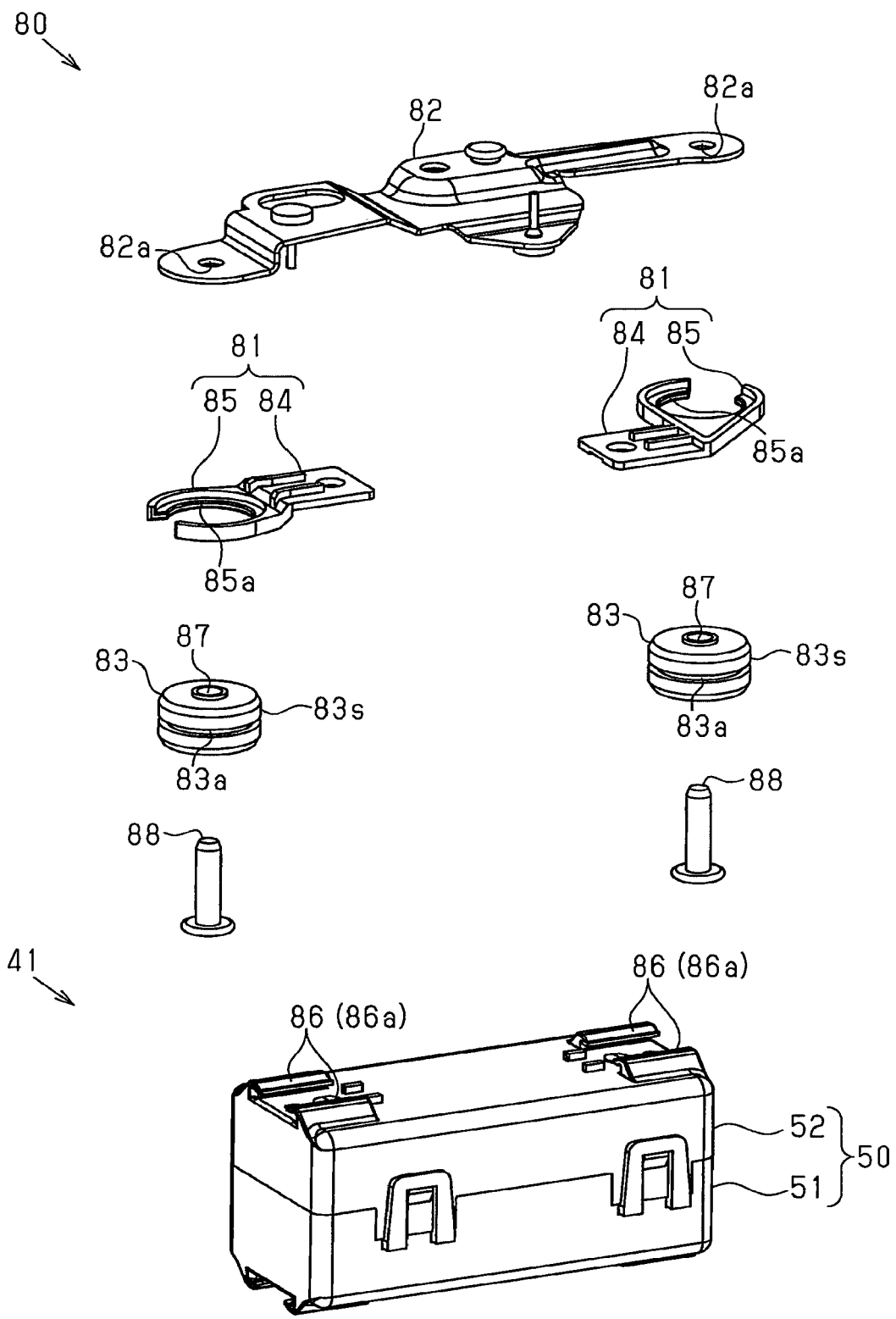
FIG. 10 is an exploded perspective view of the anti-vibration device illustrated in FIG. 5.

As shown in FIG. 10, each of the mounting brackets 81 includes a pump coupling portion 84 that has the form of a substantially flat plate and a bushing coupling portion 85 that is a substantially C-shaped ring. The bushing coupling portion 85 is connected to one end of the pump coupling portion 84. The rubber bushings 83 are substantially short circular columns. Each of the rubber bushings 83 includes an outer circumferential surface 83s. A coupling groove 83a extends along the entire outer circumferential surface 83s. The bushing coupling portion 85 of the mounting bracket 81 includes a substantially C-shaped ring coupling projection 85a that projects radially inward from the inner circumference of the bushing coupling portion 85.

Each of the bushing coupling portions 85 is coupled to the outer circumferential surface 83s of the corresponding one of the rubber bushings 83 in a state in which the coupling projection 85a is arranged in the coupling groove 83a of the rubber bushing 83. Further, the air pump device 41 includes bracket coupling portions 86 at longitudinal ends of the case 50. Each of the bracket coupling portions 86 includes two coupling pieces 86a having a substantially L-shaped cross-section and opposing each other in a transverse direction of the case 50. The pump coupling portions 84 are each sandwiched between the corresponding ones of the coupling pieces 86a so that the mounting brackets 81 are engaged with the longitudinal ends of the case 50.

The middle bracket 82 is substantially an elongated plate and includes through holes 82a at longitudinal ends. Each of the rubber bushings 83 is substantially a circular column and includes a through hole 87 that extends through the axial center. As shown in FIG. 8, a swage pin 88 is inserted through each of the through holes 82a of the middle bracket 82 and the through holes 87 of the rubber bushings 83. The two ends of the swage pin 88 are swaged to fix the rubber bushing 83 between the middle bracket 82 and the corresponding mounting bracket 81.

The anti-vibration device 80 allows for relative movement of the middle bracket 82 and the mounting brackets 81 in the axial direction and radial direction of the swage pins 88 when the rubber bushings 83 are elastically deformed. Further, elastic force (elastic resiliency) of the rubber bushings 83 reduces relative motion of the middle bracket 82 and the mounting brackets 81. Accordingly, the anti-vibration device 80 absorbs vibration of the air pump device 41.

The advantages of the present embodiment will now be described.

(1) The air pump device 41 includes the pump mechanism 44 and the motor 43, which drives the pump mechanism 44. The air pump device 41 further includes the electric pump unit 53, the case, and the anti-vibration members 70. The electric pump unit 53 is formed by the pump mechanism 44 and the motor 43 that are integrated with each other. The case 50 accommodates the electric pump unit 53. The anti-vibration members 70 are arranged between the case 50 and the electric pump unit 53. The pump mechanism 44 and the motor 43 are aligned in the axial direction of the motor 43. Further, the pump mechanism 44 includes the inlet 54 and the outlet 55 in the axial end 44a at a side opposite to the motor 43 in the axial direction of the motor 43. The case 50 includes the first wall 50a and the second wall 50b that are arranged at opposite sides of the motor 43 in the axial direction opposing the electric pump unit 53. The anti-vibration members 70 include the first and second axial anti-vibration portions 71 and 72. The first axial anti-vibration portion 71 is arranged between the electric pump unit 53 and the first wall 50a in the axial direction of the motor 43. The second axial anti-vibration portion 72 is arranged between the electric pump unit 53 and the second wall 50b in the axial direction of the motor 43. Further, the first axial anti-vibration portion 71 covers the inlet 54 to function as an air filter of the pump mechanism 44.

That is, the pump mechanism 44 and the motor 43 are aligned in the axial direction of the motor 43, and the outlet 55 of the pump mechanism 44 is located at the axial end 44a. This results in the air pump device 41 having high mountability to the seat 1. Specifically, the electric pump unit 53 is located on the side frame 3f so that the longitudinal direction of the electric pump unit 53, which corresponds to the axial direction of the motor 43, corresponds to the direction in which the side frame 3f of the seat back 3 extends. Thus, the inner space of the seat back 3 can be used efficiently. The arrangement of the outlet 55 of the pump mechanism 44 at the axial end facilitates the arrangement of the tubes 45 that form the air passage L.

The electric pump unit 53 is shaped to be elongated in the axial direction of the motor 43 such that the electric pump unit 53 easily moves in the axial direction inside the case 50. With the above structure, the axial movement of the electric pump unit 53 is absorbed by the first and second axial anti-vibration portions 71 and 72 located between the electric pump unit 53 and the case 50 (more specifically, the first and second walls 50a and 50b of the case 50) in the axial direction of the motor 43. This effectively reduces vibration generated when the electric pump unit 53 is operated. As a result, the air pump device 41 has superior quietness.

The first axial anti-vibration portion 71 functions as an air filter of the pump mechanism 44. This simplifies the structure of the air pump device 41 and reduces the axial length of the air pump device 41. Thus, in addition to improving the coupling efficiency and reducing the manufacturing cost, the above structure improves the mountability of the air pump device 41 to the seat 1.

The first axial anti-vibration portion 71 covers the inlet 54 of the pump mechanism 44 to reduce the noise of the intake air. As a result, the air pump device 41 has further improved quietness. Moreover, the inlet 54 is formed in the axial end where the outlet of the pump mechanism 44 is formed to increase the length of the intake air passage inside the pump mechanism 44. This allows for the formation of the silencer structure (for example, structure having inner diameter increased and decreased in lengthwise direction or labyrinthine structure) that takes advantage of the long length of the intake air passage inside the pump mechanism 44. Accordingly, the air pump device 41 has further improved quietness.

(2) The pump mechanism 44 is constructed as a piston pump that includes the cylinders 63 extending in the axial direction of the motor 43. Although such a piston pump has a high pumping capability, the axial length of the pump is increased. Thus, the application of the structure described in advantage (1) to such a piston pump obtains further outstanding effects.

(3) The seat device 30 includes the anti-vibration device 80 arranged between the air pump device 41 and the seat 1 (frame of the seat back 3). The anti-vibration device 80 includes the mounting brackets 81 and the middle bracket 82. The mounting brackets 81 serve as a first bracket that is fastened (coupled) to the air pump device 41. The middle bracket 82 serves as a second bracket that is fastened (coupled) to the seat 1. Further, the anti-vibration device 80 includes the rubber bushings 83 and the swage pins 88. The rubber bushings 83 are each arranged between the mounting bracket 81 and the middle bracket 82 and serve as an elastic member. The swage pins 88 are each inserted through the through hole 87 of the rubber bushing 83 and serve as a support shaft. The mounting brackets 81 each include the bushing coupling portion 85 that is coupled to the outer circumferential surface 83s of the rubber bushing 83. The middle bracket 82 couples and supports the swage pins 88 and the rubber bushings 83 in a state in which the rubber bushings 83 are elastically deformable in the axial and radial directions of the swage pins 88.

With the above structure, when the rubber bushings 83 is elastically deformed, relative movement of the mounting brackets 81 and the middle bracket 82 are allowed in the axial and the radial directions of the swage pins 88. Further, elastic force (elastic resiliency) of the rubber bushings 83 reduces the relative motion generated between the middle bracket 82 and the mounting brackets 81. This absorbs vibration of the air pump device 41. As a result, operation noise of the air pump device 41 is absorbed and striking noise produced when the air pump device 41 touches other components is reduced thereby improving quietness.

(4) The anti-vibration device 80 includes the two mounting brackets 81 and the two rubber bushings 83. The two mounting brackets 81 are spaced apart from each other in the longitudinal direction of the air pump device 41 (more specifically, the case 50 of the air pump device 41). The two rubber bushings 83 are spaced apart from each other in the longitudinal direction of the air pump device 41 (more specifically, the case 50 of the air pump device 41). Accordingly, the anti-vibration device 80 limits pivoting caused by vibration and stably supports the air pump device 41.

The above embodiment may be modified as described below.

In the above embodiment, the anti-vibration members 70 include the first and second axial anti-vibration portions 71 and 72, which are arranged between the electric pump unit 53 and the first and second walls 50a and 50b of the case 50, and the first and second radial anti-vibration portions 73 and 74, which are attached to the pump mechanism 44 and the motor 43 in the axial direction of the motor 43.

Instead, for example, the first and second radial anti-vibration portions 73 and 74 may be integrated with each other. Alternatively, the first axial anti-vibration portion 71 and the second radial anti-vibration portion 74 may be integrated with each other, and the second axial anti-vibration portion 72 and the first radial anti-vibration portion 73 may be integrated with each other. Moreover, one of the first and second axial anti-vibration portions 71 and 72 may be integrated with the first and second radial anti-vibration portions 73 and 74. Additionally, the anti-vibration members 70 may be divided into four or more anti-vibration portions. That is, the number of anti-vibration portions that construct the anti-vibration members 70 and the form in which the anti-vibration members 70 are divided can be changed in any manner as long as the anti-vibration members 70 include the first and second axial anti-vibration portions 71 and 72, and the first axial anti-vibration portion 71 covers the inlet 54 to function as an air filter of the pump mechanism 44.

In the above embodiment, the pump mechanism 44 is a piston pump including the cylinders 63 that extend in the axial direction of the motor 43. However, the pump mechanism 44 may be of any type.

In the above embodiment, the anti-vibration device 80 includes the mounting brackets 81 and the middle bracket 82. The middle bracket 82 couples and supports the swage pins 88 and the rubber bushings 83 in a state in which the mounting brackets 81 are coupled to the outer circumferential surfaces 83s of the rubber bushings 83 and the rubber bushings are elastically deformable in the axial and radial directions of the swage pins 88. Instead, the mounting brackets 81 may couple and support the swage pins 88 and the rubber bushings 83 in a state in which the middle bracket 82 is coupled to the outer circumferential surfaces 83s of the rubber bushings 83 and the rubber bushings 83 are elastically deformable in the axial and radial directions of the swage pins 88.

Further, the number of the rubber bushing 83 may be one or three or more. When the anti-vibration device 80 includes a plurality of rubber bushings 83, it is preferred that the rubber bushings 83 are arranged at locations spaced apart from each other in the longitudinal direction of the air pump device 41.

With the above structure, the air pump device 41 is arranged inside the seat back 3 along the side frame 3f. Instead, the air pump device 41 may be arranged in any manner, for example, inside the seat cushion 2 or the like.

The invention claimed is:

1. An air pump device, comprising:
   an electric pump unit that includes a pump mechanism and a motor that drives the pump mechanism, wherein the pump mechanism and the motor are integrated with each other;
   a case accommodating the electric pump unit; and
   an anti-vibration member arranged between the electric pump unit and the case, wherein
   the pump mechanism and the motor are aligned in an axial direction of the motor,
   the pump mechanism includes an inlet and an outlet, both the inlet and the outlet being located in an axial end of the pump mechanism at a side opposite to the motor in the axial direction of the motor,
   the case includes a first wall and a second wall that are located at opposite sides in the axial direction of the motor and oppose the electric pump unit, and
   the anti-vibration member includes a first axial anti-vibration portion arranged between the electric pump unit and the first wall in the axial direction of the motor, and
   a second axial anti-vibration portion arranged between the electric pump unit and the second wall in the axial direction of the motor,
   wherein the first axial anti-vibration portion covers the inlet to function as an air filter of the pump mechanism.

2. The air pump device according to claim 1, wherein the pump mechanism is a piston pump including a cylinder that extends in the axial direction of the motor.

3. A seat device comprising:
   the air pump device according to claim 1;
   a seat; and
   an air pack arranged inside the seat,
   wherein the air pump device is configured to send pressurized air to the air pack.

4. The seat device according to claim 3, comprising an anti-vibration device arranged between the air pump device and the seat, wherein
   the anti-vibration device includes a first bracket fixed to the air pump device, a second bracket fixed to the seat, an elastic member arranged between the first bracket and the second bracket, and a support shaft inserted through a through hole of the elastic member;
   one of the first and second brackets is coupled to an outer circumferential surface of the elastic member;
   the other one of the first and the second brackets supports the support shaft and the elastic member; and
   the first and the second brackets move relative to each other when the elastic member is elastically deformed in an axial direction and a radial direction of the support shaft.

5. The seat device according to claim 4, wherein
   the elastic member is one of a plurality of elastic members, and
   the elastic members are spaced apart from one another in a longitudinal direction of the air pump device.

6. The seat device according to claim 4, wherein the first bracket is one two first brackets, and the second bracket is arranged between the two first brackets.

7. The air pump device according to claim 1, wherein the outlet extends through the first wall of the case.

* * * * *